April 3, 1956
J. W. SMALL
2,740,628
CONTINUOUS FILM FEED MEANS FOR A MOTION PICTURE PROJECTOR UNIT
Filed July 14, 1951
5 Sheets-Sheet 1
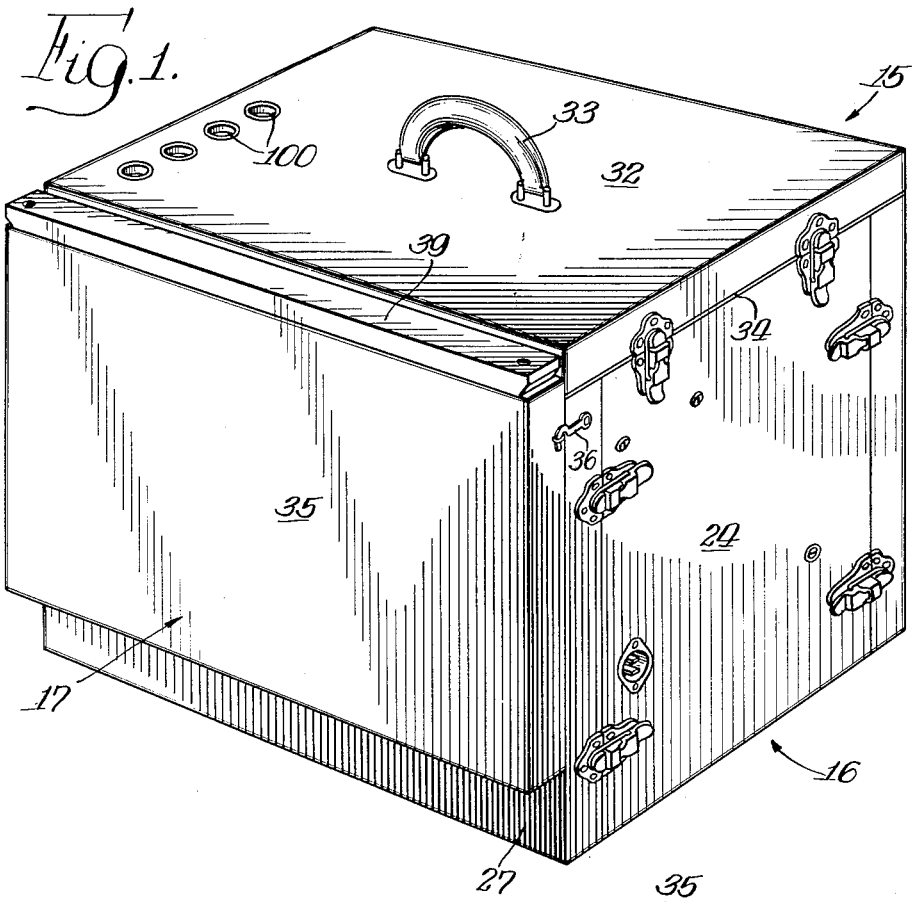
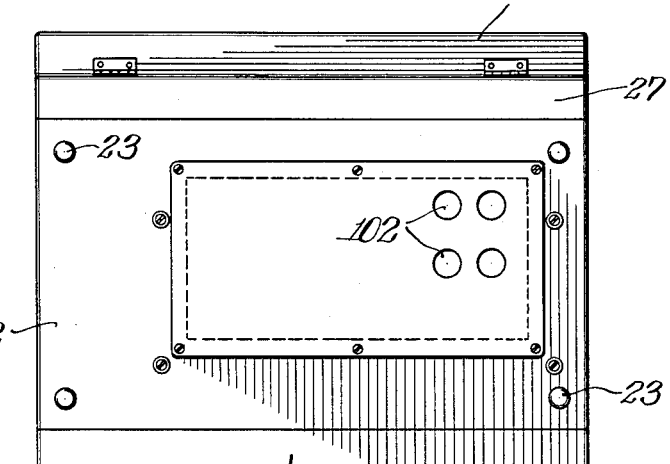
INVENTOR.
James W. Small,
BY Schrader, Merriam,
Hofgren & Brady
Attys.

April 3, 1956  J. W. SMALL  2,740,628
CONTINUOUS FILM FEED MEANS FOR A MOTION
PICTURE PROJECTOR UNIT
Filed July 14, 1951  5 Sheets-Sheet 2
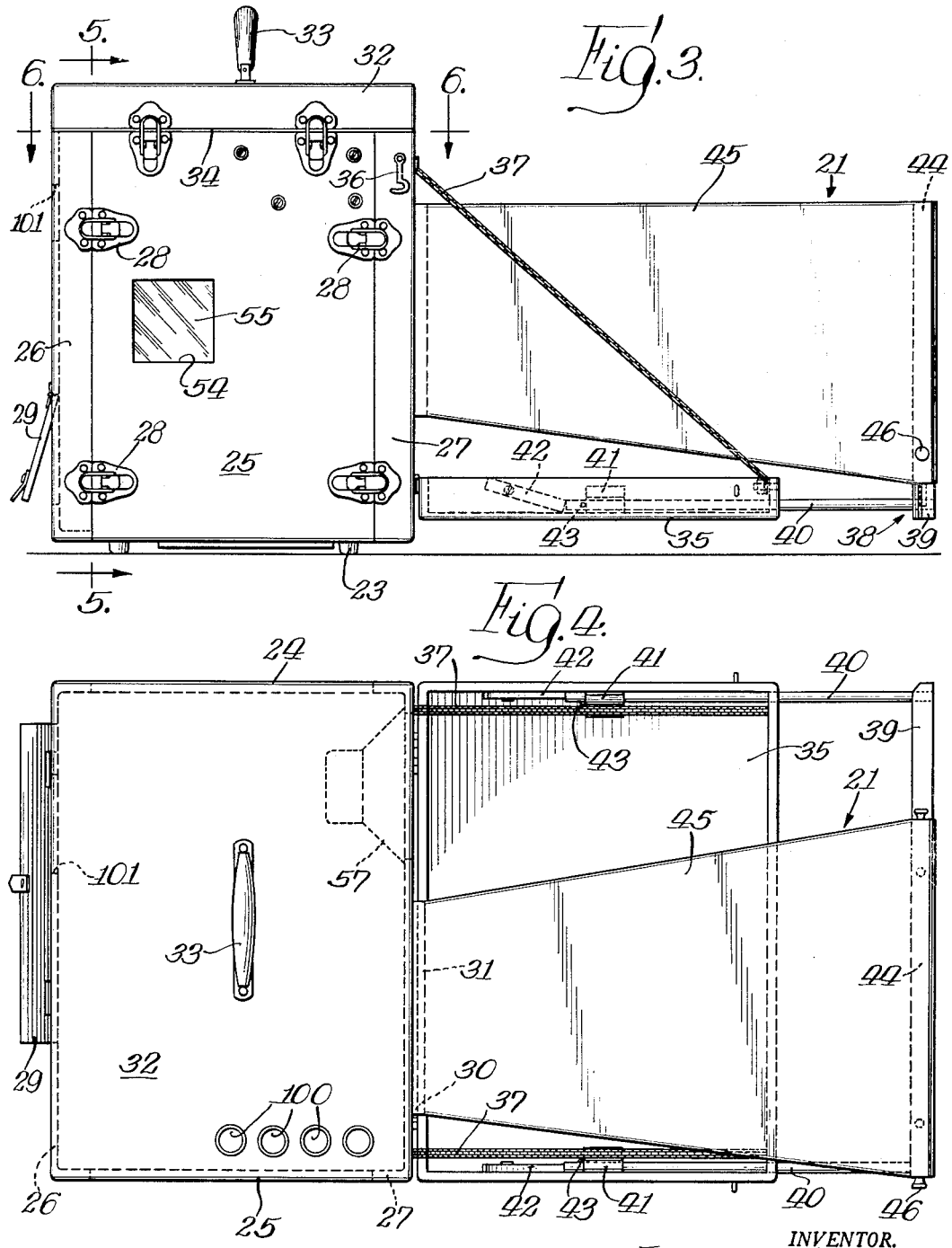
INVENTOR.
James W. Small,
BY
Atty's.

April 3, 1956

J. W. SMALL 2,740,628

CONTINUOUS FILM FEED MEANS FOR A MOTION
PICTURE PROJECTOR UNIT

Filed July 14, 1951

INVENTOR.
James W. Small,
BY *Schroeder, Merriam,*
*Hofgren & Busby*
Attys.

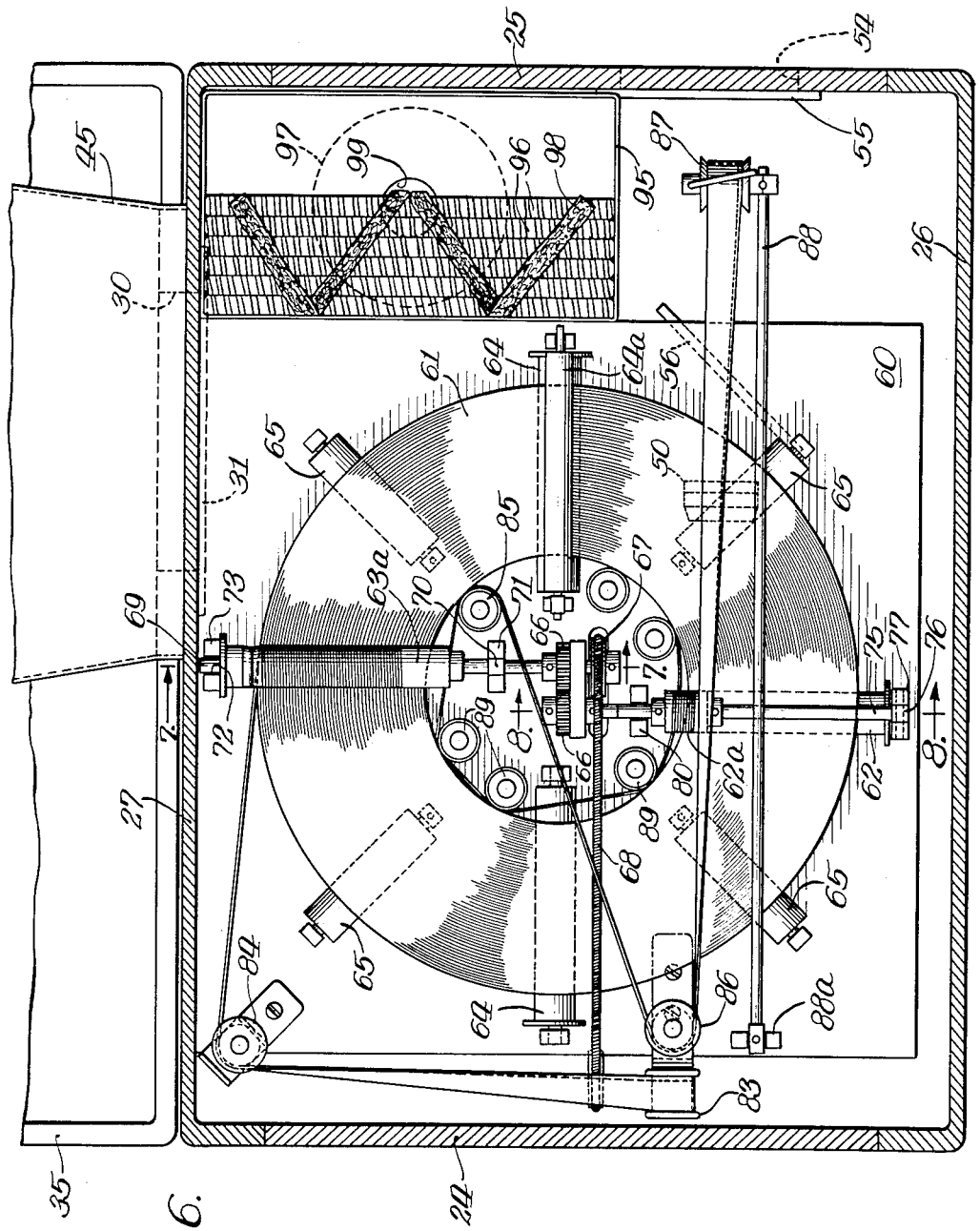

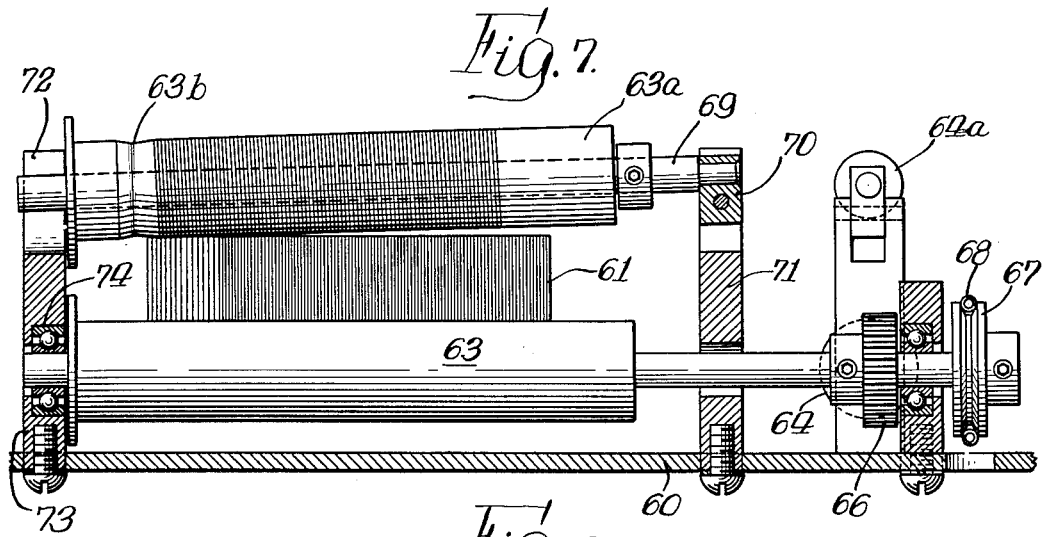
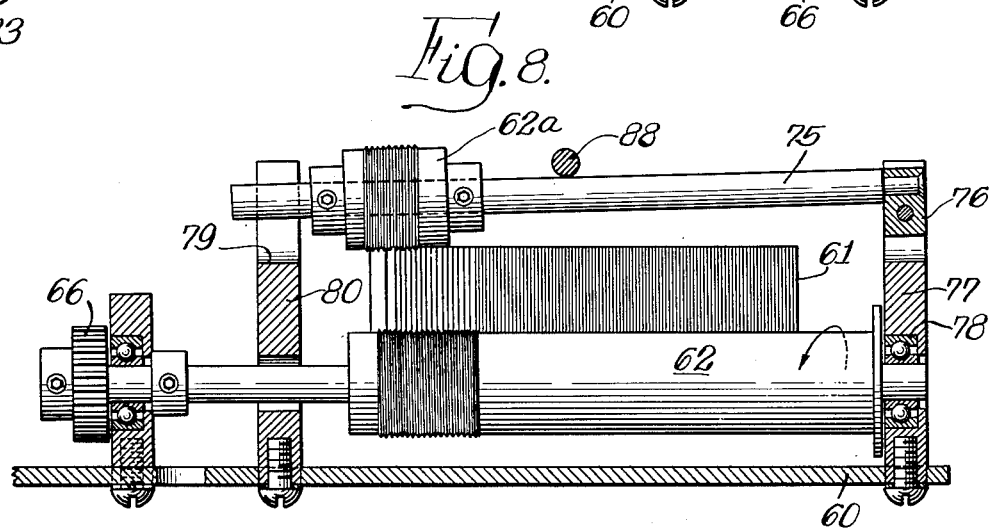
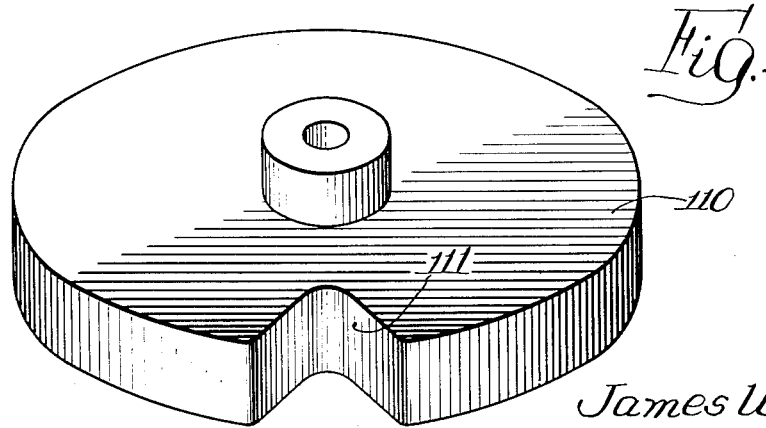

United States Patent Office 2,740,628
Patented Apr. 3, 1956

2,740,628

CONTINUOUS FILM FEED MEANS FOR A MOTION PICTURE PROJECTOR UNIT

James W. Small, Chicago, Ill.

Application July 14, 1951, Serial No. 236,770

20 Claims. (Cl. 271—2.18)

The invention relates generally to a motion picture projector unit and more particularly to a continuously operating, endless film projector unit.

One object of the invention is to provide a new and improved projector unit capable of continuous reprojection without the attention of an operator and without interruption for rewinding.

Another object is to provide a continuously operating projector unit in which the film is wound in a manner permitting continuous withdrawal of the film from the inside of the coil or reel and continuous addition to the outside.

Another object is to provide a continuously operating projector unit in which the wound film is supported with each convolution free to move and continually moving relative to the other convolutions and the support.

Still another object is to provide a projector unit of the character described in the immediately preceding object in which all portions of the film have approximately the same linear speed but the angular speed increases from the outer to the inner convolution thereby causing a continual decrease in the radius of the convolutions.

A further object is to provide a continuously operating projector unit in which the wound film is supported with each convolution free to move and continually moving relative to the other convolutions and the support with means for feeding the inner convolutions dependent upon the tension of the strip of film.

Other objects and advantages will become apparent from the following detailed description taken in connection with the accompanying drawings, in which:

Fig. 1 is a perspective view of a projector unit embodying the features of this invention.

Fig. 2 is a bottom plan view of the unit of Fig. 1.

Fig. 3 is an end elevational view taken from the back in Fig. 1 and with the screen shown extended in operative position.

Fig. 4 is a top plan view of the unit in the condition shown in Fig. 3.

Fig. 6 is a horizontal sectional view taken along the line 6—6 of Fig. 3.

Fig. 7 is an enlarged fragmentary vertical sectional view taken approximately along the line 7—7 of Fig. 6.

Fig. 8 is an enlarged fragmentary vertical sectional view taken approximately along the line 8—8 of Fig. 6.

Fig. 9 is a perspective view of a means on which the film is wound preparatory to placing it in the projector unit.

Figure 5:
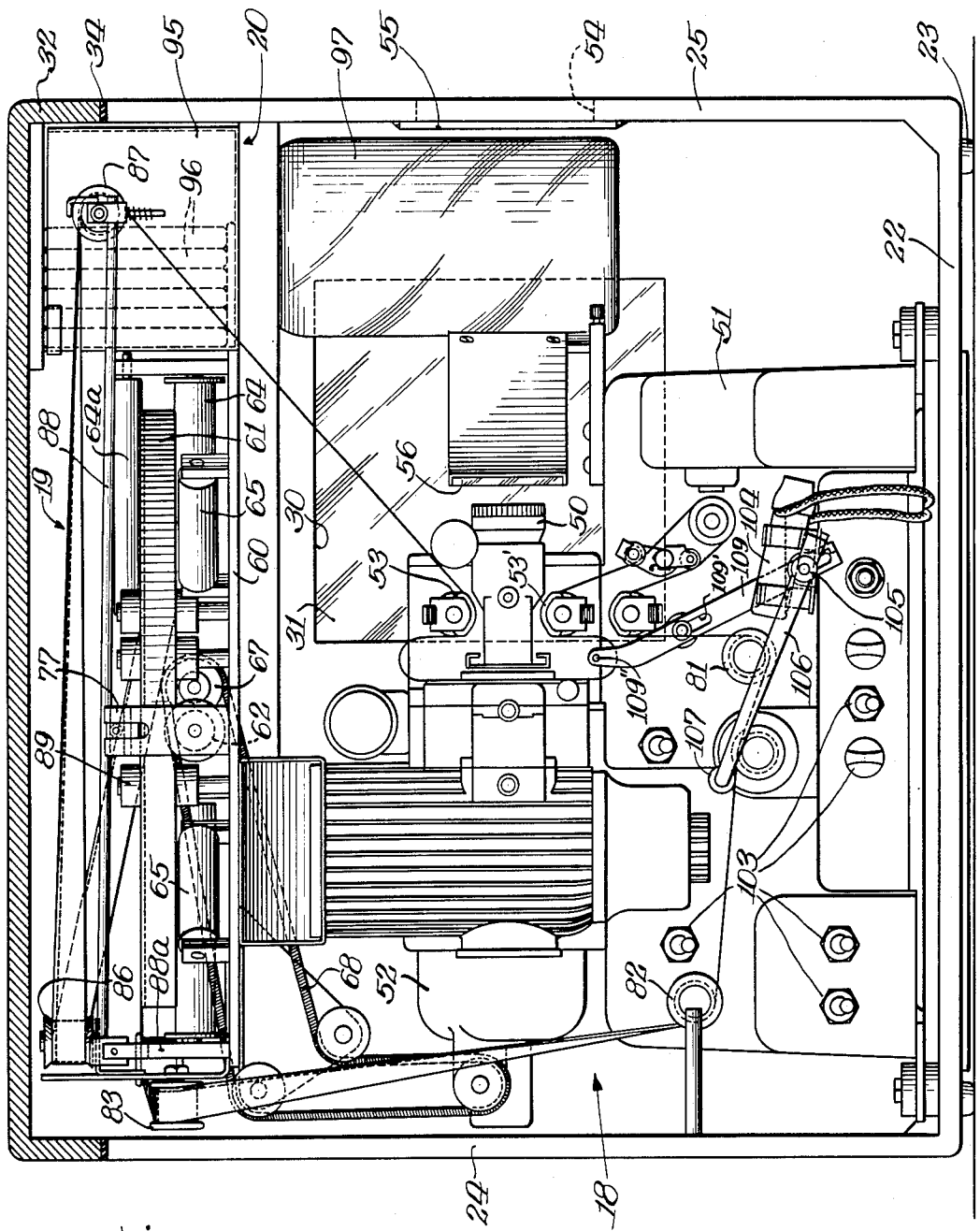
Fig. 5 is an enlarged vertical sectional view taken along the line 5—5 of Fig. 3.

While the invention is susceptible of various modifications and alternative constructions, it is shown in the drawings and will hereinafter be described in a preferred embodiment. It is not intended, however, that the invention is to be limited thereby to the specific construction disclosed. On the contrary it is intended to cover all modifications and alternative constructions falling within the spirit and scope of the invention as defined in the appended claims.

As shown in the drawings for purposes of disclosure, the unit comprises generally an approximately cubical housing 15 subdivided into a main casing 16 and a subcasing 17. Housed in the main casing is the operating mechanism which herein is composed of a projector proper 18, film winding and unwinding means 19, and air washing and humidifying means 20. Housed in the subcasing 17 is means generally designated 21 providing a screen onto which the pictures are projected.

*Housing*

As above stated generally, the operating mechanism and means providing a screen are all contained in a generally cubical housing for convenient transportation of the unit. The housing is comparatively small approximating dimensions of 14″ x 18½″ x 18½″. The main casing comprises a base or bottom wall 22 carrying feet 23 for raising it off of any table or support upon which it may rest so as to permit air circulation underneath the bottom wall for a purpose that will presently be made more apparent. Integral with the bottom wall 22 at each end thereof are end walls 24 and 25 to form, as best seen in Fig. 5, a generally U-shaped construction. For convenience these walls will be referred to, respectively, as the rear and the front end walls. Completing the peripheral wall portion of the main casing are two side walls 26 and 27 which will again be referred to as the front and the rear side walls, respectively. These walls are completely removable and are secured firmly in position by means of luggage-type clasps 28. The front wall 26 has near the bottom thereof a hinged portion 29 which may be opened to give ready access to the controls for operating the projector. The rear side wall 27 is formed with an opening 30 preferably closed with a pane 31 of some transparent medium such as glass, this opening serving as the means through which the pictures are projected onto the screen of the screen-forming means 21, as will presently be described. Completing the main casing is a top wall or cover 32 again adapted to be firmly secured to the end walls through the medium of clasps 28 of the same type as employed for securing the side walls. The cover or closure 32 has a handle 33 attached thereto for convenient carrying of the housing. Interposed between the cover and the upper edges of the end and side walls is a rubber gasket 34 to provide a tight seal between the cover and the wall portions. It will be apparent from the foregoing description that the main casing is a tightly closed unit save for certain ventilating openings that will be later described.

The subcasing 17 is composed of a shallow tray-like member 35 having a length equal to that of the side wall 27, a width somewhat less than the height of the side wall 27, and a thickness of a few inches. The tray-like member 35 is hinged at one of its longitudinal edges near the bottom of the side wall 27 so that it may occupy a position parallel with the side wall 27, as best seen in Fig. 1. This position will for convenience hereinafter be referred to as the closed or inoperative position, and the member 35 is held in this position by means of hooks 36. The member 35 is also adapted to be swung to a horizontal or operative position, as best seen in Figs. 3 and 4, it being supported in that position by means of chains 37 extending from the free edge of the traylike member to a point near the upper edge of the side wall 27. Carried by the member 35 is an extensible bracket 38 consisting of a cross bar 39 and two rods 40 rigid therewith and projecting slidably through the free edge of the tray-like member 35 and through a guide 41 positioned within the tray-like member intermediate its hinged and free edges. In retracted position the bracket 38, particularly the cross bar 39 thereof, rests on the free edge of the tray-like member 35 and appears to form a part thereof, as best seen in Fig. 1. It is held in extended position by means of dogs 42 that drop down behind the end of each rod 40. Undue extension is precluded by means of a pin 43 extending diametrically of each rod so as to abut the guide 41 when the bracket has been extended its proper distance.

In order that the projector unit forming the subject matter of this invention may be completely self-contained requiring no additional and particularly no extraneous mechanism, provision is made whereby the projector unit provides its own screen with the additional provision that the picture may be viewed in daylight. To that end there is swingably attached to the cross bar 39 of the bracket 38 a frame 44 mounting therein a translucent glass or plastic element forming the screen. Extending from this frame to the side wall 27 and attached to the side wall in surrounding relation to the opening 30 therein is a flexible and foldable tubular bellows 45. The bellows, of course, is of a completely opaque material and is attached to the side wall 27 and to the frame 44 in a manner to exclude all external light. The frame 44 is secured in upright position by means of knurled nuts 46. It is believed apparent from the foregoing that when the projector unit is to be set up for use it is merely necessary to release the hooks 36, swing the tray-like member 35 down to its horizontal position, extend the bracket 38 and swing the frame 44 to vertical position securing it in that position by tightening the nuts 46. The reverse procedure is equally simple and thus a screen usable in daylight as well as dark is always readily available.

Projector proper

The projector proper, generally designated 18, is of standard and conventional construction and requires no detailed description. Suffice it to say, therefore, that it is composed of in the main of a light source, a fan for circulating air to cool the projector (both of which are enclosed and not visible in the elevational view of the projector shown in Fig. 5), lens means 50, sound reproducing means 51, various sprockets, guide rolls or pulleys over or around which the film runs so as to be presented to the projection means and the sound reproducing means, and a motor 52 for driving the fan and the sprockets which in turn drive the film. Requiring specific mention are the drive sprockets 53, 53' located immediately ahead of and behind the straight or uncoiled, herein vertical, run of the film through the projector proper. These sprockets, as is well known, engage the perforations in the film strip and are driven at a fixed speed. Herein this speed is 180 R. P. M. and the sprockets are ¾" in diameter. For convenience in subsequent reference, the sprockets 53, 53' will be referred to as top feed and lower loop sprockets, respectively.

The projector 18 is positioned in the lower portion of the main housing where it is bolted to the bottom wall 22. The lens means 50 is directed toward the end wall 25 of the housing and to that end the end wall is formed with an opening 54 covered by a pane of transparent material 55 so that the unit could be employed for projection onto a separate screen located remote from the projector unit. For projection onto the screen formed as a part of the unit, a mirror 56 is disposed at the proper angle in front of the lens means 50 so as to deflect the light rays through the opening 30 and onto the screen carried by the frame 44. The speaker 57 forming a part of the sound reproducing means is mounted on the inside of the wall 27 in a position such that the opening in the wall through which the sound emanates is concealed and protected when the subcasing is in inoperative position.

Coiling and uncoiling means

Located in the upper portion of the main housing above the projector 18 is the film winding and unwinding means 19. This means is constructed to support a coil of film for rotation as a whole and for relative rotation of individual turns or convolutions of the coil. The means 19, moreover, is designed to provide for continuous coiling and uncoiling of the film strip by adding convolutions to the exterior of the coil and drawing the film strip away from the interior of the coil, the mechanism serving meanwhile to bring about progressive reduction in the diameter of added convolutions to maintain the diameter of the coil as a whole substantially constant. As will presently be apparent from the more detailed description, the winding and unwinding mechanism functions generally by imparting to all portions of the film strip a substantially uniform linear speed while progressively increasing the angular velocity and reducing the diameter of the individual turns or convolutions from the outside inwardly, with certain very important exceptions essential to the successful operation of the mechanism. The linear speed is, of course, that of the film strip as it passes through the projector, which in turn is that determined by the drive sprockets 53, 53'.

To the ends above described, the winding and unwinding means comprises a horizontally disposed plate 60 forming a partial wall dividing the main housing into upper and lower compartments, and also serving as the base or support of the winding and unwinding means. Mounted on the plate 60 to support a coil 61 for rotation as a whole, as well as for relative rotation of individual turns of the coil, are a plurality of rollers. These may be divided into three groups, namely, driving rollers 62 and 63, supporting rollers 64, and auxiliary rollers 65. The auxiliary rollers 65 are herein shown as four in number, are equally spaced angularly, are freely rotatable, and are, of course, disposed with their axes radially. The supporting rollers 64 are herein shown as two in number with the one nearest the point of addition of film strip having disposed above it a roller 64a serving merely to prevent the newly applied turn from climbing up on the coil. They too are freely rotatable, are disposed with their axes on a diameter of the coil, and each is of a length greater than the radial thickness of the coil to give support to all of the turns or convolutions of the coil. Rollers 62 and 63, as above indicated, are power driven and are driven at the same rate. To that end, each of the rollers 62 and 63 has fixed on its shaft spur gears 66 which are identical and which mesh with one another. Also fast on one of the shafts, herein that of the roller 63, is a pulley 67. The rollers 62 and 63 are driven from the motor of the projector through a coiled wire belt 68. Rollers 62 and 63 do not have a true radial location of their axes but each is offset laterally from a true radial position by approximately the radius of the rollers 62 and 63, all as most clearly seen in Fig. 6.

In order that the power rollers 62 and 63 may be assured of good frictional contact with the coil, at least one of the supporting rollers 64 is positioned a fraction of an inch lower than the power rollers. The auxiliary rollers 65 are positioned even lower than the low support roller and are intended and necessary to give support to the film strip only when the coil is at rest and when the strip is unduly flexible due to excess humidity.

Roller 63 is smooth, has a diameter of ¾", the same as the sprockets 53, 53', but is arranged to be driven at a higher R. P. M. than the sprockets, preferably at about 230 R. P. M. Paired with and positioned above the roller 63 is a roller 63a. One end of shaft 69 of roller 63a is rotatably journaled in a bearing 70 which is in turn pivotally mounted in a bracket 71 upstanding from the plate 60. The other end of shaft 69 is free so that the roller 63a may readily be swung either to its operative position shown in Fig. 7 wherein it extends across the coil 61, or to a vertical position to facilitate the placing of a coil on or the removal of a coil from the rollers supporting the same. When the roller 63a is in its operative position, shown in Fig. 7, the free end of its shaft 69 is received in a slot 72 formed in a bracket 73 upstanding from the plate 60 and which also houses roller bearings 74 in which the outer end of the roller 63 is journaled. The height of the bearing 70 above the plate 60 is such that roller 63a when resting on a coil of film inclines downwardly from the bearing outwardly so as to engage only outer turns or convolutions of the coil 61. For a purpose which will presently be made more fully known, roller 63a is also formed with fine threads, near its outer end, with a shallow groove 63b having gently sloping sides. For the direction of rotation of the coil as herein driven, the threads on roller 63a are right-hand threads.

Roller 62 near its inner end is also formed with threads and over the threaded portion has a diameter of ¾". The balance of the roller on either side of the threaded portion is undercut .020". Being driven at the same R. P. M. as roller 63, both the roller 63 and the threaded portion of the roller 62 will have a peripheral speed greater than that of the sprockets 53 and thus will tend to impart a higher linear speed to the convolutions of the coil in contact therewith.

Paired with and located above the roller 62 is a threaded roller 62a. Like the roller 63a, roller 62a is fast on a shaft 75 which is journaled at one end in a bearing 76 pivotally mounted in a bracket 77 upstanding from the plate 60 and housing ball bearings 78 in which one end of the roller 62 is journaled. The other end of shaft 75 of roller 62a is, when the roller is in operative position, received in a slot 79 formed in the upper edge of a bracket 80 upstanding from the plate 60. Roller 62a is short but its threads extend inwardly a greater distance than the threads on shaft 62 so that they may cause disengagement of the innermost turn of the coil with the threads on shaft 62 for a purpose later to be described. The threads on roller 62 and roller 62a are herein shown as right-hand and left-hand, respectively, and are so positioned that they engage only inner turns of the coil 61. Rollers 62 and 63 are driven to rotate coil 61 clockwise, as viewed in Fig. 6, which means that, as viewed in Fig. 5, roller 62 has a counterclockwise rotation while roller 63 has a clockwise rotation. Conversely, paired rollers 62a and 63a have a clockwise and a counterclockwise rotation, respectively.

As has been stated, the film strip is wound onto the outside of coil 61 and taken off of the inside. To that end, the film as it comes from the sprocket 53' is threaded around various guide spools to pass past the sound reproducing means 51, the floating and weighted slack tape-up spool 81, and thence over a series of spools 82, 83 and 84 to be supplied to the outer periphery of the coil in on-edge position, as best seen in Fig. 6, at the point where the coil passes between the rollers 63 and 63a. The film strip is taken off from the center of the coil where it passes around a rotatable post 85 mounted on the plate 60 with its axis vertical, thence over to a guide spool 86 positioned outside of the coil from where the film strip passes over a guide spool 87 on the end of a lever 88 and thence back to the projector proper. Completing means defining the inner circumference of the coil 61 are a series of rotatable posts 89, similar to the post 85. These rollers are all free and serve merely to retain the inner turn or convolution of the coil in place at such times when temporarily the rate of withdrawal of the film strip is greater than the advance of the inner convolutions of the coil.

In order that there be no snubbing action of the inner convolutions of the coil around the posts 89, means is herein provided for varying the feed of the inner convolutions with the tension of the film strip as it is drawn from the coil 61. This means includes the already described guide spool 87 and lever 88. As best seen in Fig. 6, the spool 87 is mounted at one extreme end of the lever 88 and the other end of the lever 88 is pivoted at 88a on the plate 60 adjacent the guide spool 86 to extend at right angles to the roller 62a. In fact, the lever 88 rests on the shaft 75 of the roller 62a so as to apply greater pressure to the roller 62a as the tension increases and lesser pressure as tension on the film strip decreases.

For a better understanding of the invention, the functioning of the winding and unwinding means will be described briefly. With the rollers 62 and 63 driven and with the coil resting thereon, they will of course impart rotation to the coil as a whole. Moreover, with the roller 63 and the threaded portion of the roller 62 having the same diameter as the sprockets 53 but driven at a higher R. P. M. the tendency will be to drive the coil at a rate such that its outer periphery has a linear speed greater than that of the film strip running through the projector but, of course, this is impossible and hence the necessity and desirability for a frictional drive between the film strip and the winding and unwinding mechanism. With the coil supported only primarily at four points, and with one point lower than the others, the coil will as it rotates have a slight undulating or flexing movement thereby tending to break the surface adhesion between the turns of the coil and thus facilitating relative movement between the turn of the coil.

Not only do the rollers 62 and 63 tend to rotate the coil as a whole, but, because they are driven rollers, they tend to drive each individual turn or convolution of the coil, an effect which would not be obtained were the support for the coil a mere rotating plate. Since the roller 63, for example, is of the same circumference throughout its length it tends to impart to each turn or convolution coming in contact with it the same linear speed. To the extent that each successive turn of the coil from the outside inwardly has a radius smaller by approximately the thickness of the film strip, the rollers will tend to impart to it a greater angular velocity. Since the linear speed of all portions of the coil tends to be the same, the smaller convolutions can have a greater angular velocity only by a reduction in diameter and thus the natural tendency of the convolutions of the coil when driven by the rollers 62 and 63 is to become smaller in diameter so that eventually an outer turn shrinks progressively until it has the diameter of the innermost turn.

Inasmuch as the rollers 62 and 63 tend to rotate the coil such that the linear speed of the outer periphery of the coil is greater than that of the film strip as determined by the sprockets 53, and since there must be some pull on the strip to carry it up from the last powered sprocket to the coil there would be a tendency to wind new turns onto the coil too tightly unless provision were made to offset that tendency. This is where the roller 63a enters into the picture. In the first place, due to its sloping mounting it engages turns near the outer margins of the coil only. Because of its hinged mounting and its weight, it being a solid brass roller, the frictional force between the turns of the coil and the roller 63 is, of course, greatest for those turns that are pressed against the roller 63 by the roller 63a. This in itself has a tendency to drive those certain turns at a faster linear rate than the turns not engaged by the roller 63a. The result is that there is a tendency of those certain turns to increase slightly in diameter or at least to delay the reduction in diameter above described. Aiding this process is the presence of the right-hand threads on the roller 63a for the pitch of the threads tends to move the turns outwardly. This expansion of the turns could, however, be carried too far. To prevent this the groove 63b is provided. Should the coil expand too much, one or more turns slough off into the groove 63b. This reduces the frictional engagement of the rollers 63 and 63a with these turns. It also permits roller 63a to swing slightly lower and engage turns inwardly of the sloughed off turns and temporarily drive them faster to reduce their diameter to a desired value.

At the inner margins of the coil provision must be made to prevent the turns from becoming too small and snubbing against the rotatable posts 89. Here the film strip is being pulled away by the sprocket 53 and the natural tendency would be for the film strip to snub around the rotatable posts 89. This tendency is counteracted by the roller 62a and the lever 88 and its spool 87 arranged to be sensitive to the tension of the film strip and to cause the roller 62a to apply greater or lesser pressure as the tension increases or falls. With the application of more pressure, the tendency of the roller 62a will, of course, be to drive those turns between the rollers 62 and 62a at a higher linear rate than other turns having only light frictional engagement with the rollers 62 and 63. With this increased linear speed, the tendency again is to expand, thereby preventing snubbing of the strip around the posts 89. The threads on the rollers 62 and 62a are provided to provide better frictional engagement between the rollers and the edges of the film strip and also for the purpose of separating the convolutions at the inner margins of the coil to reduce friction, for the relative movement between turns is greatest with the smaller turns. To that end, the roller 62 is given a right-hand thread, while the roller 62a is given a left-hand thread. The undercut portion on the inner end of roller 62 and the termination of the threads outwardly of the threads on roller 62a is provided to furnish a support for the innermost turn while not driving the same with too much effect. Since the innermost turn is not completely confined, it could project between the posts 89, and it should not be fed faster than it is taken away by sprocket 53.

Thus it will be seen that the coil is supported for rotation as a whole and for relative rotation of the individual turns with change in angular velocity and diameter. All of the turns are frictionally driven to tend to bring about a generally uniform linear speed with increasing angular speed and reduction in diameter progressively from the outer turn inwardly, with certain outer and certain inner turns temporarily driven at variance to this pattern to supply certain necessary forces and to offset or counteract frictional and other forces created by the operation. This makes possible a continuous addition of turns to the exterior of the coil and subtraction of turns from the interior of the coil, with both the external and the internal circumferences of the coil remaining substantially the same.

Control of atmospheric condition

It has been found that the condition of the film is of great importance in a successfully operating, continuous projector. As film is run through a projector, moisture is, of course, driven off due to the heat from the projector light source. As film becomes dehumidified it not only curls, which of course interferes with the operation of the projector, but it also becomes brittle and thus tends to break more easily. Means is provided herein not only for maintaining the moisture in the film at a proper value during the operation of the projector, but also for maintaining the atmosphere at the proper relative himidity when the unit is not in operation so that the film may be stored right in the casing. To that end, there is mounted in an upper corner of the main housing the humidifying means 20. Herein this means comprises a box 95 open at the top and the side facing toward the coil 61, and containing a plurality of frames 96 with wicks wound thereon. Depending below the box 95 is a jar 97 having feeder wicks 98 extending thereinto through a hole 99 in the bottom of the box 95. The upper margins of the box 95 are so positioned that they seal against the cover 32 when it is in place. Formed in the cover above the box 95, as best seen in Fig. 4, are a plurality of apertures 100 serving as air intake openings. Thus during operation of the projector the fan draws air in through the openings 100 and through the frames of wicking 96 where the air is filtered and humidified. This humidified air then flows over, around and under the coil 61 where it functions to restore to the film moisture that was driven off as the film passed through the warm projector proper. The air then circulates around the casing and is eventually drawn into the projector to circulate over the light source, and is then expelled from the casing through an exhaust opening 101, best seen in Figs. 3 and 4.

In order that the velocity of the air drawn through the humidifier and over the coil may not be so great that there is little opportunity for the air to pick up moisture from the humidifying means and for the film in turn to pick up moisture from the air, a second air inlet to the casing is provided. This inlet, as best seen in Fig. 2, is located in the bottom wall 22 of the casing and again consists of a plurality of small openings 102. As seen in Fig. 5 and as previously described, the bottom wall 22 is by the feet 23 raised above any surface on which the unit may be placed so that there is opportunity for air to enter the openings 102.

The openings 102 also serve a second purpose. With arrest of the projector, the fan, of course, ceases to operate and thus ceases to draw air in through either the openings 100 or 102. Considerable heat remains in the projector, however, and, were the circulation of air entirely precluded, this residual heat of the projector would be trapped and function to dehydrate the film. With the openings 102 located in the bottom of the casing, natural convection draws cool air into the casing through the openings 102 and expels the same through the openings 100 in the cover. Once the projector has cooled off and the internal and external temperatures equalized this convection-induced flow of air ceases and the air in the casing, particularly the air in the upper portion of the main housing adjacent the humidifying means, takes on a relative humidity of about 60% which is an ideal humidity for the storage of film.

Controls

The projector proper is, of course, provided with the usual controls for starting the motor, controlling the volume of the sound, and so forth. These are in the particular projector herein disclosed all located on one side of the projector, as best seen in Fig. 5. They are generally identified by the reference character 103 and are accessible from the exterior of the casing through the hinged closure 29, previously described. Also forming a part of the controls of the unit herein disclosed is a means for automatically arresting operation of the unit should the film break. This means takes the form of a mercury switch 104 pivotally mounted at 105 and functioning to close a circuit when tilted in one direction and to break a circuit when tilted in the opposite direction. The switch is connected in series with the main supply leads to the projector so that all functioning of the projector is arrested should the switch be tilted to break the circuit. Controlling the tilting of the switch 104 is an arm 106 attached at one end to the switch 104 and at the other end carrying a spool 107 that rides on a horizontal run of the film. It is to be noted that spool 107 rides on the film strip at a point just barely beyond the guide spool 108. This has the advantage that the spool and arm 106 are not as effective in weighing down the strip as they would be were the spool to engage the run at a point midway between the spools 108 and 82. As a result, less force is required to draw the film strip upwardly and onto the coil yet the switch is operative should there be an actual break in the film strip. The arm 106, its spool 107, and the switch 104 are so biased as to tend to swing to that position of the switch breaking the circuit, unless held in the other position. Herein the horizontal run of the film above mentioned constitutes the means for holding the lever and its spool 107 in switch-closed position. Thus, should the film break, the spool 107 will drop down and, through tilting of the switch 104, break the power supply circuit to the projector.

A second means is also provided for tilting the switch 104 in the event of improper operation. This means comprises the link 109 slidably mounted by means of the slots 109' therein and at its upper end carrying a pin 109" projecting into what is commonly referred as the lower loop of the film strip. Should feed of the film to the projector be interrupted for some reason, the sprocket 53', nevertheless, will tend to draw the film away from the projector which means, of course, that the lower loop will be shortened and thus will engage the pin 109" and slide the link 109. The lower end of the link is provided with a projection for engaging and tilting the switch 104 to shift the same to circuit-breaking position.

As a matter of fact, the switch 104 is not actuated solely by the two means described but is effective to arrest operation of the unit should there be breakage or improper operation of other parts. For example, should the drive belt 68 break there would, of course, be no take-up of the film strip by the coiling means but the sprockets 53 and 53' would continue to feed the film strip through the projector and thus would supply slack beyond the spool 108 permitting the arm 106 to tilt the switch. The switch is sensitive enough even to be actuated by the film strip itself should, for example, there be a bulging of the film strip out of its normal path at a point around the spool 81 or in advance thereof such that the bulge would come in contact with and press against the switch.

A conventional film is easily wound into a coil and converted into an endless film and then quickly mounted on or removed from the winding and unwinding mechanism of the projector unit. For convenience, a disk 110, such as shown in Fig. 9, may be employed. The beginning of the film is placed in the V-notch 111 cut in the periphery of the disk and the film then wound onto the disk. After a film has been wound on the disk, the film and the disk may be placed on a flat surface and the disk removed. The ends of the films are then spliced together and enough of the film unwound to provide the footage necessary to thread the film through the projector unit. Rollers 62a and 63a are then swung to their inoperative position and the coiled film placed on the supporting rollers. The rollers are then returned to their operative position, shown in Figs. 7 and 8, the loose loop of the film threaded around the various guide spools, and the machine is ready for operation.

I claim as my invention:

1. An endless-strip coiling and uncoiling means for use with a device having means for advancing an uncoiled length of the strip at a fixed rate comprising means supporting a coil, composed of a plurality of turns of the strip, for rotation as a whole and for relative rotation of individual turns of the coil, guide elements guiding withdrawal of the strip from the interior of the coil and return thereof to the exterior, and means driving the coil to impart rotation thereto as a whole and relative rotation to the individual turns of the coil including means for driving the turns in the intermediate portion of the coil and different means for driving the turns at both the outer and inner periphery of the coil.

2. An endless-strip coiling and uncoiling means for use with a device having means for advancing an uncoiled length of the strip at a fixed rate comprising means supporting a coil, composed of a plurality of turns of the strip, for rotation as a whole and for relative rotation of individual turns of the coil, guide elements guiding withdrawal of the strip from the interior of the coil and return thereof to the exterior, means driving intermediate turns of the coil through frictional force dependent upon the weight of the strip, and means cooperating in the driving of inner and outer peripheral end turns only of the coil operable to increase the frictional force.

3. An endless-strip coiling and uncoiling means for use with a device having means for advancing an uncoiled length of the strip at a fixed rate comprising means supporting a coil, composed of a plurality of turns of the strip, for rotation as a whole and for relative rotation of individual turns of the coil, guide elements guiding withdrawal of the strip from the interior of the coil and return thereof to the exterior, and means frictionally engaging the strip in the coil at an edge of the strip and tending to effect rotation of the turns of the coil including means for engaging certain of the outer turns only, to apply greater frictional force thereto than the remainder of said coil.

4. An endless-strip coiling and uncoiling means for use with a device having means for advancing an uncoiled length of the strip at a fixed rate comprising means supporting a coil, composed of a plurality of turns of the strip, for rotation as a whole and for relative rotation of individual turns of the coil, guide elements guiding withdrawal of the strip from the interior of the coil and return thereof to the exterior, means driving outer turns of the coil to add strip thereto including means for tending continually to expand the outer turns, and means driving inner turns of the coil to subtract strip therefrom including means for tending to separate adjacent turns responsive to tension between said turns and said advancing means.

5. An endless-strip coiling and uncoiling means for use with a device having means for advancing an uncoiled length of the strip at a fixed rate comprising means supporting a coil, composed of a plurality of turns of the strip, for rotation as a whole and for relative rotation of individual turns of the coil, guide elements guiding withdrawal of the strip from the interior of the coil and return thereof to the exterior, means driving outer turns of the coil to add strip thereto including means for tending continually to expand the outer turns, and means frictionally driving inner turns of the coil to subtract strip therefrom including means responsive to the tension of the strip between the coil and the advancing means and regulating the frictional driving force.

6. An endless-strip coiling and uncoiling means for use with a device having means for advancing an uncoiled length of the strip at a fixed rate comprising means supporting a coil, composed of a plurality of turns of the strip, for rotation as a whole and for relative rotation of individual turns of the coil, guide elements guiding withdrawal of the strip from the interior of the coil and return thereof to the exterior including a series of guide posts annularly arranged to define the inner margins of the coil, means frictionally engaging outer turns only and driving the same to add turns to the coil, and means frictionally engaging inner turns of the coil and tending to drive the strip faster than the rate of the advancing means, a portion of said last named means being independent of the means engaging outer turns of the coil.

7. An endless-strip coiling and uncoiling means for use with a device having means for advancing an uncoiled length of the strip at a fixed rate comprising means supporting a coil, composed of a plurality of turns of the strip, for rotation as a whole and for relative rotation of individual turns of the coil, guide elements guiding withdrawal of the strip from the interior of the coil and return thereof to the exterior, a first element uniformly engaging substantially all turns of the coil and capable of driving successively smaller turns at progressively increasing angular rates, and a second element engaging certain outer turns only and in cooperation with said first element tending to drive the strip composing said certain outer turns at a linear rate greater than that of adjacent turns not engaged by said second element to keep the outer turns expanded and loose.

8. An endless-strip coiling and uncoiling means for use with a device having means for advancing an uncoiled length of the strip at a fixed rate comprising means supporting a coil, composed of a plurality of turns of the strip, for rotation as a whole and for relative rotation of the individual turns of the coil, guide elements guiding withdrawal of the strip from the interior of the coil and return thereof to the exterior, a first element engaging turns of the coil and capable of driving successively smaller turns at progressively increasing rates, a second element engaging certain inner turns only and in cooperation with said first element being capable of driving the strip composing said certain inner turns at a linear rate greater than that of adjacent turns not engaged by said second element, and means responsive to the tension of the strip between the coil and the strip advancing means controlling said second element to vary the linear rate at which the strip composing said certain inner turns are driven to maintain said certain inner turns free for withdrawal from the coil with normal tension on the run of the strip from the coil to the advancing means.

9. An endless flat-strip coiling and uncoiling means comprising means supporting a coil, composed of a plurality of turns of the strip, including a plurality of horizontally disposed rollers extending generally radially of the coil, at least one of said rollers being driven and extending over the entire radial dimension of the coil for possible engagement of all turns of the coil to impart, by frictional engagement with an edge of the turns, rotation to the coil as a whole and relative rotation to the individual turns of the coil with turns progressively greater distances inwardly from the exterior of the coil tending to be driven at an increasingly greater angular rate, guide elements guiding withdrawal of the strip from the interior of the coil and return thereof to the exterior, and a roller overlying the coil at said driven roller in position to engage and bear upon the upper edges of the strip composing certain turns of the coil, said overlying roller being disposed with its axis in a common plane with the axis of said driven roller but at a slight angle therewith to engage outer turns only of said coil.

10. An endless flat-strip coiling and uncoiling means according to claim 9, in which said driven roller is cylindrical and smooth and said overlying roller is formed with threads.

11. An endless flat-strip coiling and uncoiling means according to claim 9, in which said driven roller is uniformly cylindrical and said overlying roller is formed with right-hand threads.

12. An endless flat-strip coiling and uncoiling means according to claim 9, in which the overlying roller is pivotally supported at its inner end for swinging in a vertical plane either to an inoperative position completely away from above the coil or to an operative position with its outer end resting on certain outer turns only of the coil.

13. An endless flat-strip coiling and uncoiling means according to claim 12, in which said overlying roller is of a length comparable to that of said driven roller, is formed with right-hand threads of approximately forty to the inch over a majority of its length, and in which the pivotal support for the inner end of said overlying roller is high enough to accommodate coils of varying radial thickness and still have engagement between said roller and outer turns only of the coil.

14. An endless flat-strip coiling and uncoiling means for use with a device having means for advancing an uncoiled length of the strip at a fixed rate comprising means supporting a coil composed of a plurality of turns of the strip including a plurality of horizontally disposed rollers extending generally radially, at least two of said rollers being driven and disposed above at least one of the other supporting rollers to effect a vertical flexing action to break the surface adhesion between turns of the coil, means including an inner end portion of one of said driven rollers operable to engage certain inner turns of the coil with increased frictional force, and guide elements guiding withdrawal of the strip from the interior of the coil and return thereof to the exterior.

15. In an endless flat-strip coiling and uncoiling means for use with a device having means for advancing an uncoiled length of the strip at a fixed rate, a driven roller disposed beneath the coil and extending generally radially thereof, said roller having near its inner end a threaded portion, a second roller having a threaded portion overlying said driven roller in a position to engage inner turns only of the coil, said second roller having a shaft, a pivotally mounted bearing in which the outer end of said shaft is journaled for swinging of the roller in a vertical plane, a lever arm pivotally mounted at one end and extending transversely across and resting on the shaft of said second roller, and a guide spool on the free end of said lever engaging the strip at the run between the coil and the advancing means to make the lever and said second roller responsive to the tension of that run of the strip.

16. An endless flat-strip coiling and uncoiling means according to claim 9, in which said overlying roller is pivotally mounted at its inner end, is formed with threads which due to their pitch tend to urge turns of the coil engaged by the threads radially outwardly, and which outwardly of the threads is formed with a shallow groove having gently sloping sides.

17. In an endless flat-strip coiling and uncoiling means for use with a device having means for advancing an uncoiled length of the strip at a fixed rate, a driven roller disposed beneath the coil and extending generally radially thereof, said roller having near its inner end a threaded portion and being unthreaded and slightly undercut on either side of the threaded portion, a second roller overlying said driven roller and having a threaded portion extending inwardly beyond the end of the threaded portion of said driven roller, a shaft upon which said second roller is fast pivotally mounted at its outer end to support said second roller for swinging movement in a vertical plane, the threads on both rollers having a pitch tending to urge inwardly turns of the coil engaged by the threads with the threads of the second roller tending to urge the innermost turn inwardly beyond the threads of said driven roller, and means for varying the pressure applied by said second roller.

18. An endless flat strip coiling and uncoiling means for advancing an uncoiled length of the strip at a fixed rate comprising means supporting a coil composed of a plurality of turns of the strip including a plurality of horizontally disposed rollers extending generally radially, at least two of said rollers being driven and with one of said driven rollers being threaded over a portion of its inner end and having a slightly reduced diameter cylindrical portion outwardly of the threaded portion, means including an inner end portion of one of the said driven rollers operable to engage certain inner turns of the coil with increased frictional force, and guide elements guiding withdrawal of the strip from the interior of the coil and return thereof to the exterior.

19. An endless flat-strip coiling and uncoiling means according to claim 18, in which the threads of the threaded portion are right-hand threads and tend to spread the inner turns of the coil by urging the same inwardly.

20. An endless flat-strip coiling and uncoiling means for advancing an uncoiled length of the strip at a fixed rate comprising means supporting a coil composed of a plurality of turns of the strip including a plurality of horizontally disposed rollers extending generally radially, at least two of said rollers being driven and with one of said driven rollers being disposed at a height relative to other supporting rollers to be assured of engagement with the turns of the coils, means including an inner end portion of one of said driven rollers operable to engage certain inner turns of the coil with increased frictional force including a roller disposed to engage the top edge of the strip composing the inner turns of the coil at a point above the one of said driven rollers having the inner end portion for engagement of the inner turns of the coil and means responsive to the tension of the strip between the coil and the advancing means for varying the downward pressure of said last named roller, and guide elements guiding withdrawal of the strip from the interior of the coil and return thereof to the exterior.

(References on following page)

References Cited in the file of this patent

UNITED STATES PATENTS

| | | |
|---|---|---|
| 918,884 | Mills | Apr. 20, 1909 |
| 1,459,795 | Pavely et al. | June 26, 1923 |
| 1,615,298 | Bartlam | Jan. 25, 1927 |
| 1,713,921 | Roueller | May 21, 1929 |
| 1,713,939 | Wingren | May 21, 1929 |
| 1,716,774 | Halla | June 11, 1929 |
| 2,044,267 | Wiggins | June 16, 1936 |
| 2,281,328 | Shapiro | Apr. 28, 1942 |
| 2,332,717 | Heyer | Oct. 26, 1943 |
| 2,363,403 | De Napoli | Nov. 21, 1944 |
| 2,398,639 | Heyer | Apr. 16, 1946 |
| 2,419,961 | Links | May 6, 1947 |
| 2,436,032 | Bendfelt | Feb. 17, 1948 |
| 2,530,936 | Bohl, Jr. | Nov. 21, 1950 |